(12) United States Patent
Nagamori (10) Patent No.: US 9,308,830 B2
(45) Date of Patent: Apr. 12, 2016

(54) ELECTRIC VEHICLE

(71) Applicant: MITSUBISHI JIDOSHA KOGYO KABUSHIKI KAISHA, Tokyo (JP)

(72) Inventor: Takeo Nagamori, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 14/401,185

(22) PCT Filed: Mar. 19, 2013

(86) PCT No.: PCT/JP2013/057848
§ 371 (c)(1),
(2) Date: Nov. 14, 2014

(87) PCT Pub. No.: WO2014/002537
PCT Pub. Date: Jan. 3, 2014

(65) Prior Publication Data
US 2015/0129334 A1 May 14, 2015

(30) Foreign Application Priority Data
Jun. 29, 2012 (JP) .................................. 2012-147958

(51) Int. Cl.
| B60R 16/03 | (2006.01) |
| B60R 16/033 | (2006.01) |
| B60R 16/04 | (2006.01) |
| B60L 11/18 | (2006.01) |

(Continued)

(52) U.S. Cl.
CPC ............... *B60L 11/1877* (2013.01); *B60K 1/04* (2013.01); *B60R 16/0215* (2013.01); *B60K 2001/0438* (2013.01)

(58) Field of Classification Search
CPC   B60R 16/04; B60R 16/0215; B60R 16/0222; B60K 1/04; B60K 2001/045; B60K 2001/0405; B60K 2001/0416; B60K 2001/0433; B60K 2001/0438; H01M 2/1083
See application file for complete search history.

(56) References Cited

U.S. PATENT DOCUMENTS 7,172,042 B2 *  2/2007  Yamaguchi et al. ......... 180/65.1
7,497,284 B2 *  3/2009  Yamaguchi et al. ......... 180/65.1

(Continued)

FOREIGN PATENT DOCUMENTS

JP   2001-294048 A   10/2001
JP   2002-95142 A     3/2002

(Continued)

*Primary Examiner* — Joseph Rocca
*Assistant Examiner* — Travis Coolman
(74) *Attorney, Agent, or Firm* — Birch, Stewart, Kolasch & Birch, LLP (57) ABSTRACT

An electric vehicle comprises: a battery installed under a floor panel; an electrical component unit installed above the floor panel and behind the battery; an electric power supply harness connecting the electrical component unit and the battery; and a motor driven by electric power from the battery. A mounting portion where the harness is mounted is provided on a bottom surface of the electrical component unit. The mounting portion faces an opening of the floor panel, and the mounting portion has a fixing portion on the front side thereof in the longitudinal direction of the vehicle, the fixing portion allowing the harness to be fixed thereto in such a manner as to be routed toward the front of the vehicle. An inclined surface inclined downwardly toward the front of the vehicle is provided on the back side of the mounting portion in the longitudinal direction of the vehicle.

12 Claims, 5 Drawing Sheets

(51) Int. Cl.
  *B60K 1/04* (2006.01)
  *B60R 16/02* (2006.01)

(56) References Cited

U.S. PATENT DOCUMENTS

| | | | |
|---|---|---|---|
| 7,973,250 B2 * | 7/2011 | Groeller et al. | 174/481 |
| 8,276,697 B2 * | 10/2012 | Takasaki | 180/68.5 |
| 8,418,823 B2 * | 4/2013 | Matsumura | 191/10 |
| 8,444,216 B2 * | 5/2013 | Yamaguchi et al. | 296/208 |
| 8,556,016 B2 * | 10/2013 | Yoda et al. | 180/68.5 |
| 8,739,910 B2 * | 6/2014 | Katayama et al. | 180/68.5 |
| 8,919,466 B2 * | 12/2014 | Suzuki | 180/65.21 |
| 8,936,303 B2 * | 1/2015 | Awakawa et al. | 296/208 |
| 8,981,221 B2 * | 3/2015 | Sawada et al. | 174/72 A |
| 9,061,714 B1 * | 6/2015 | Albery et al. | |
| 2011/0233969 A1 | 9/2011 | Yamaguchi et al. | |
| 2012/0268062 A1 * | 10/2012 | Yoneda | 320/107 |
| 2013/0162075 A1 * | 6/2013 | Chinavare et al. | 310/85 |
| 2013/0257374 A1 * | 10/2013 | Ichikawa et al. | 320/109 |
| 2014/0232184 A1 * | 8/2014 | Ukai | 307/10.1 |

FOREIGN PATENT DOCUMENTS

| | | |
|---|---|---|
| JP | 2005-132348 A | 5/2005 |
| JP | 2005-247064 A | 9/2005 |
| JP | 2006-264510 A | 10/2006 |
| JP | 2010-143436 A | 7/2010 |
| JP | 2011-25863 A | 2/2011 |

* cited by examiner

ELECTRIC VEHICLE

TECHNICAL FIELD

This invention relates to an electric vehicle.

BACKGROUND ART

Electric vehicles each have a battery pack, a motor as a drive source, and an inverter for converting direct current from the battery pack into alternating current for entry into the motor. The battery pack, the motor and the inverter are connected by high tension cables. That is, in the electric vehicle, electric power from the battery pack is inputted into the inverter via the high tension cable, and the AC current converted from the DC current by the inverter is inputted via the other high tension cable into the motor as the drive source.

With such an electric vehicle, an electrical component system, the battery and the motor may be provided at different positions relative to a floor panel. The electric vehicle described in Patent Document 1, for example, has a structure in which the battery is provided on the floor panel, so that the high tension cable from the battery penetrates the floor panel (see, for example, Patent Document 1).

PRIOR ART DOCUMENTS

Patent Documents

Patent Document 1: JP-A-2011-25863

SUMMARY OF THE INVENTION

Problems to be Solved by the Invention

In Patent Document 1 showing the electric vehicle configured to have the high tension cable penetrating the floor panel, the high tension cable is protected with a tubular wall protruding in a tubular shape from the circumferential edge of the resulting floor penetrating hole. If the vehicle has a collision from behind, however, the floor panel may move forward, thereby bringing the tubular wall itself into contact with the high tension cable to damage the high tension cable.

The above problem is not limited to the rear collision of the vehicle, but may be encountered depending on the state of wiring of the electrical component unit and the cables, even upon a lateral or front collision of the vehicle.

It is an object of the present invention, therefore, to provide an electric vehicle which solves the foregoing problem of the conventional technology, and which minimally causes damage to a high tension cable when the high tension cable penetrates a floor panel.

Means for Solving the Problems

The electric vehicle of the present invention comprises a battery disposed on a lower part of a floor panel of the vehicle; an electrical component unit, disposed on an upper part of the floor panel, for converting electric power supplied from the battery to output the converted electric power to a motor; an electric power supply harness for connecting the electrical component unit and the battery; and a mounting portion for passing the electric power supply harness through an opening provided in the floor panel, and mounting the electric power supply harness to the electrical component unit, wherein the mounting portion opposes an opening edge of the opening, and has a guide portion for guiding the electric power supply harness obliquely downwardly of the opening. In the present invention, as noted above, the mounting portion opposes the opening edge of the opening, and has the guide portion for guiding the electric power supply harness obliquely downwardly of the opening. Even if the opening edge of the floor panel is moved in a collision of the vehicle, for example, from behind, therefore, the opening edge of the floor panel is moved to the forward and downward side of the vehicle while being guided by the guide portion. Thus, contact of the floor panel with the electric power supply harness can be prevented.

Preferably, a fixing portion for fixing the electric power supply harness to the mounting portion is fastened to the lower end of the guide portion with a bolt. Since the bolt is provided at the lower end of the fixing portion, an end of the floor panel is guided by the bolt and further moved obliquely downwardly of the vehicle, even if the end of the floor panel is moved in a collision. Thus, the contact of the floor panel with the electric power supply harness can be prevented.

Preferably, the electric vehicle is further provided with a three-phase wire harness for connecting the electrical component unit and the motor provided on the lower part of the floor panel. Also preferably, the electrical component unit has a mounting pedestal portion, arranged side by side with the mounting portion, for fixing the three-phase wire harness, and the mounting pedestal portion faces the opening of the floor panel and projects downwardly relative to the floor panel. Of the three-phase electric wires, the electric wire provided nearest the rear end of the vehicle is disposed forwardly of the mounting portion. According to the present invention, as mentioned above, the three-phase wire harness as well is provided on the mounting pedestal portion. Thus, even if the end of the floor panel is moved in a collision of the vehicle, the end of the floor panel contacts the mounting pedestal portion, thereby making it possible to suppress its contact with the three-phase wire harness and to prevent the contact of the floor panel with the three-phase wire harness. Moreover, the electric wire provided nearest the rear end of the vehicle, among the three-phase wires, is disposed ahead of the mounting portion. Consequently, even if the end of the floor panel moves forward beyond the mounting pedestal portion, its contact with the three-phase wire harness can be inhibited by the mounting portion.

In a preferred embodiment of the present invention, the guide portion opposes the opening edge, located on a rear side of the vehicle, of the opening, and guides the electric power supply harness forwardly and obliquely downwardly of the opening.

The respective electric wires of the three-phase wires enveloped in the three-phase wire harness are preferably arranged in a row in the longitudinal direction of the vehicle. So arranging the respective electric wires in a row can prevent a short circuit due to damage caused only to one of the three-phase wires.

Effects of the Invention

The above-described electric vehicle of the present invention can exhibit the excellent effect that the high tension cable is minimally damaged when the high tension cable penetrates the floor panel.

MODE FOR CARRYING OUT THE INVENTION

The electric vehicle of the present invention will now be described with reference to FIGS. 1 to 5.

Figure 1:
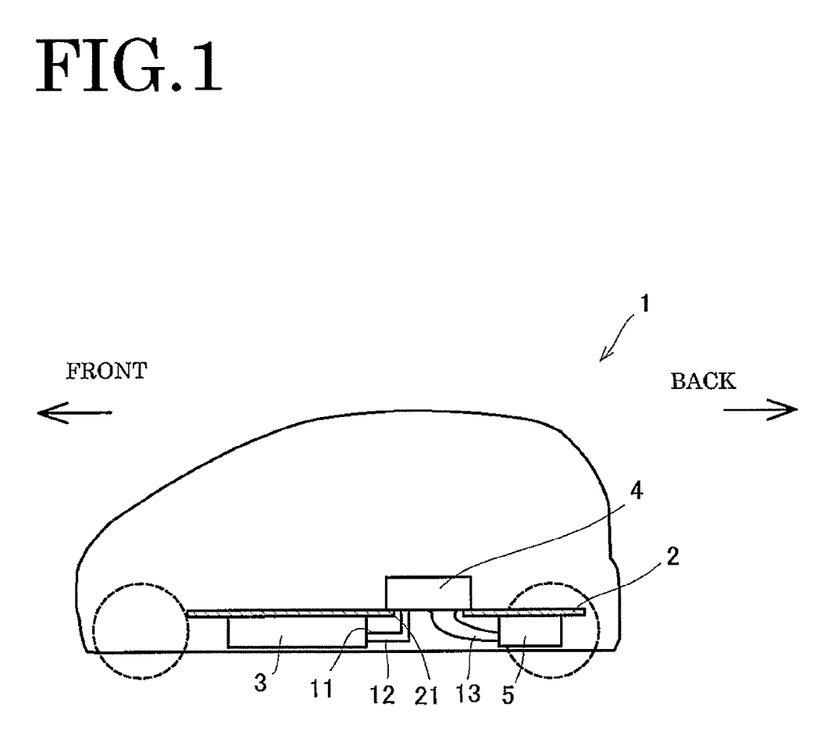
[FIG. 1] is a schematic side view of an electric vehicle according to the present embodiment.

In an electric car 1, which is an electric vehicle, a battery 3 is provided on a front side, in a longitudinal direction of the vehicle, of a floor panel 2. The battery 3 is provided below the floor panel 2, namely, in such a manner as to be supported by a frame (not shown) outside a vehicle compartment. The battery 3 is composed of a plurality of cells connected in series in its interior.

On a back side, in the longitudinal direction of the vehicle, of the floor panel 2 relative to the battery 3, an inverter (electrical component unit) 4 is installed on the floor panel 2, namely, within the vehicle compartment. In the present embodiment, the inverter 4 is provided on the floor panel 2, that is, within the vehicle compartment, so that a waterproof structure for the inverter 4 is not necessary. Further rearwardly of the inverter 4 in the longitudinal direction of the vehicle, a motor 5 is provided below the floor panel 2. That is, in the present embodiment, the inverter 4 is installed on the floor panel 2, while the battery 3 and the motor 5 are installed below the floor panel 2.

Between the battery 3 and the inverter 4, there are provided a first high voltage harness 11 enveloping a plus wire for connecting the battery 3 and the inverter 4, and a second high voltage harness 12 enveloping a minus wire for connecting the battery 3 and the inverter 4. In the present invention, the first high voltage harness 11 and the second high voltage harness 12 are also collectively called an electric power supply harness. The electric power supply harness is routed from the inverter 4 toward the battery 3, namely, toward the front of the vehicle.

Between the inverter 4 and the motor 5, there is provided a third high voltage harness 13 (three-phase wire harness) enveloping three-phase wires (U wire, V wire, W wire) for connecting the inverter 4 and the motor 5. The third high voltage harness 13 is routed from the inverter 4 toward the motor 5, namely, toward the back of the vehicle. In the present invention, the first to third high voltage harnesses will hereinafter be also collectively called a high voltage harness.

In the electric car 1, electric power from the battery 3 is inputted to the inverter 4 via the first high voltage harness 11 which is the plus wire. The inputted current, DC current, is converted into AC current by the inverter 4, and inputted to the motor 5 via the third high voltage harness 13 involving the three-phase wires to drive the motor 5.

By the way, the inverter 4 is provided on the floor panel 2, and the battery 3 and the motor 5 are provided below the floor panel 2. Thus, the high voltage harness penetrates the floor panel 2, namely, an opening 21 provided in the floor panel 2. The state of penetration of the floor panel 2 by the high voltage harness will be explained below using FIGS. 2 and 3.

Figure 2:
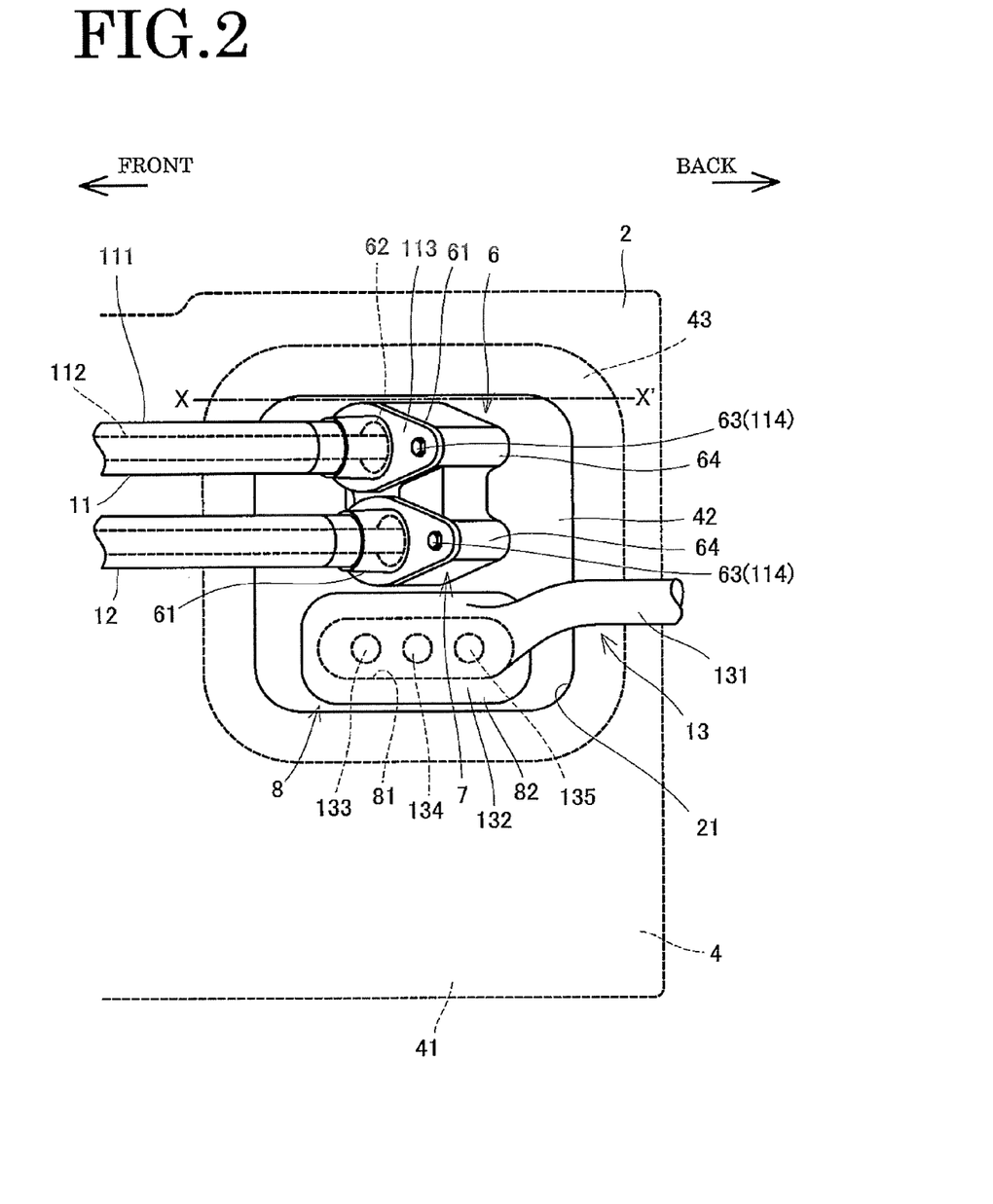
[FIG. 2] is a partial bottom view of the electric vehicle according to the present embodiment.
Figure 3:
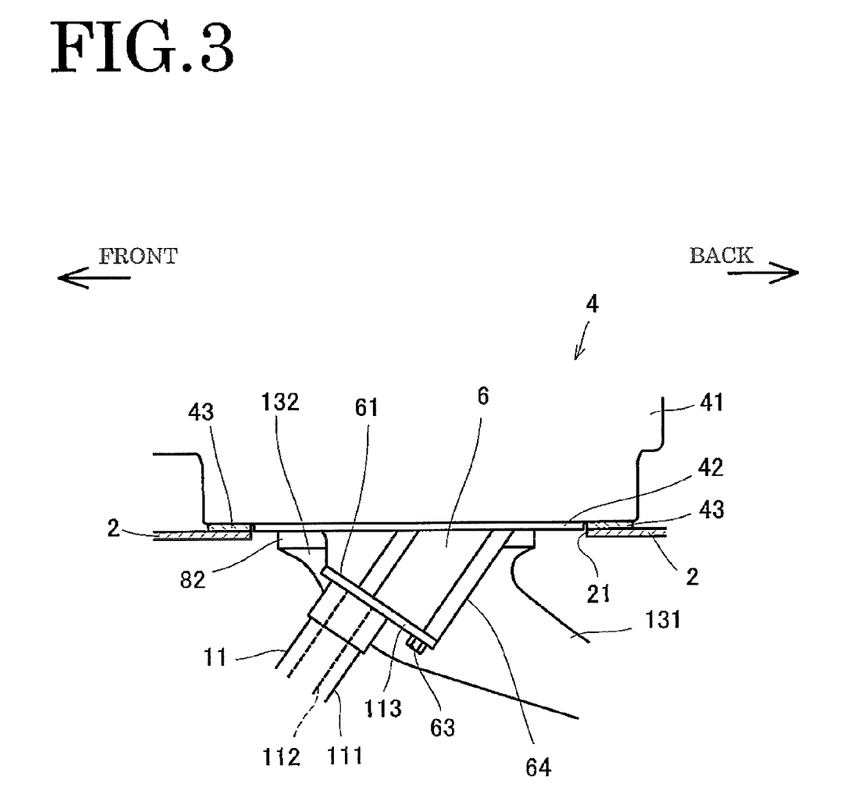
[FIG. 3] is a sectional schematic view taken on line X-X' in FIG. 2.

A casing 41 of the inverter 4 has a bottom surface, where a mounting surface 42 to be mounted with the high voltage harness is provided. The mounting surface 42 faces the opening 21 of the floor panel 2, and is exposed at the bottom of the floor panel. The periphery of the mounting surface 42 is surrounded with a sealing portion 43 comprising a urethane resin, and the inverter 4 is disposed on the floor panel 2 such that the circumferential edge of the sealing portion 43 and the circumferential edge of the opening 21 of the floor panel coincide with each other. Since the opening 21 is sealed with the sealing portion 43 in this manner, entry of water into the vehicle compartment from the position of installation of the inverter 4 can be prevented.

The mounting surface 42 is provided with a first mounting portion 6 for mounting thereon the first high voltage harness 11. The first mounting portion 6 is provided with a fixing portion 61, toward the front of the vehicle, for fixing thereto the first high voltage harness 11.

The first high voltage harness 11 will be described concretely. The first high voltage harness 11 has a plus wire 112 enveloped within a sheathing portion 111. A flange portion 113 is provided about the outer periphery of the sheathing portion 111, and a flange portion bolt hole 114 is provided in the flange portion 113. The fixing portion is 61 provided with an opening 62, frontward and upward in the longitudinal direction of the vehicle, for insertion of the plus wire 112. At a lower end part of the fixing portion 61, a bolt hole (not shown) is provided.

The first high voltage harness 11 is fixed by inserting a bolt 63 into the bolt hole and the flange portion bolt hole 114 provided in the flange portion 113, with the plus wire 112 being inserted into the opening 62 provided in the fixing portion 61. In this configuration, the first high voltage harness 11 is routed from the inverter 4 toward the front of the vehicle, namely, toward the battery 3 (see FIG. 1).

The first mounting portion 6 is provided with an inclined portion (guide portion) 64, toward the back of the vehicle, which inclines frontward and downward of the vehicle. That is, the first mounting portion 6 has the fixing portion 61 toward the front of the vehicle and the inclined portion 64 toward the back of the vehicle. Thus, the first mounting portion 6 is in a nearly triangular shape when viewed laterally. The bolt 63 is provided in an apical section located in a lower part of the first mounting portion 6 of this triangular shape.

On the mounting surface 42, the second high voltage harness 12 is mounted similarly to the first high voltage harness 11. That is, the mounting surface 42 is provided with a second mounting portion 7 on which the second high voltage harness 12 is mounted; the second high voltage harness 12 is in the same configuration as the first high voltage harness 11; and the second mounting portion 7 is in the same configuration as the first mounting portion 6. Thus, the second high voltage harness 12 is also fixed to a fixing portion 61 of the second mounting portion 7, and is thus routed toward the front of the vehicle.

Furthermore, the mounting surface 42 is provided with a third mounting portion 8 on which the third high voltage harness 13 is mounted. The third mounting portion 8 has, provided therein, a third opening 81 of a nearly rectangular shape when viewed from the bottom thereof, and a mounting pedestal portion 82 provided on the periphery of the third opening 81. The longitudinal direction of the third opening 81 coincides with the longitudinal direction of the vehicle, while the lateral direction of the third opening 81 coincides with the width direction of the vehicle. On the mounting pedestal portion 82, a mounting portion 132 provided in a sheathing portion 131 of the third high voltage harness 13 is mounted by a fixing member (not shown). The mounting pedestal portion 82 is provided to protrude toward the floor relative to the floor panel 2.

Three-phase wires enveloped in the sheathing portion 131 of the third high voltage harness 13 are arranged in a row in the third opening 81 in the longitudinal direction of the vehicle. That is, of the three-phase wires, a U wire 133, a V wire 134 and a W wire 135 are arranged in a row, in this order in the front-to-back direction of the vehicle. Of the three-phase wires, the W wire 135 at the rearmost position in the longitudinal direction of the vehicle is provided to be located ahead of a rear end part of the first mounting portion 6.

In the present embodiment, the high voltage harness is routed below the floor panel 2, not within the vehicle compartment, beginning at the bottom surface of the inverter 4. This results in improved safety. Since the high voltage harness is routed below the floor panel 2 as above, moreover, workability is high. Furthermore, according to the structure of the present embodiment, safety in a collision of the vehicle struck from behind is high, as will be described below.

Figure 4:
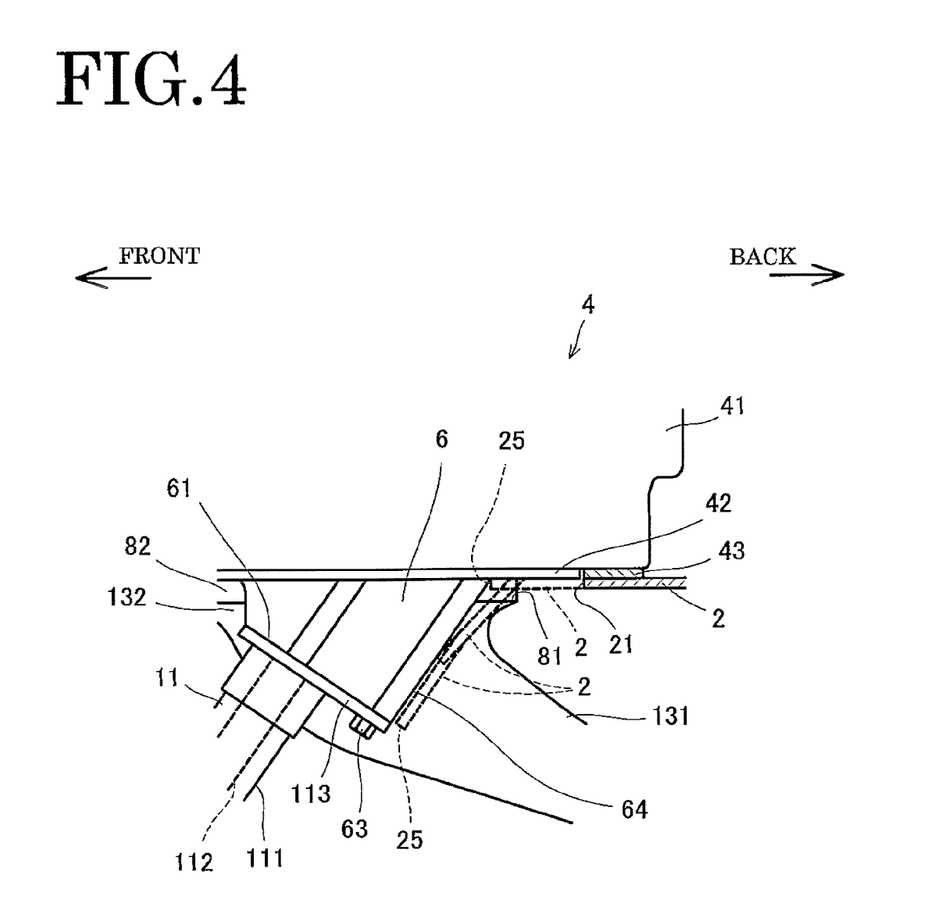
[FIG. 4] is a partial side view of the electric vehicle according to the present embodiment, showing the state of the vehicle in a rear collision.
Figure 5:
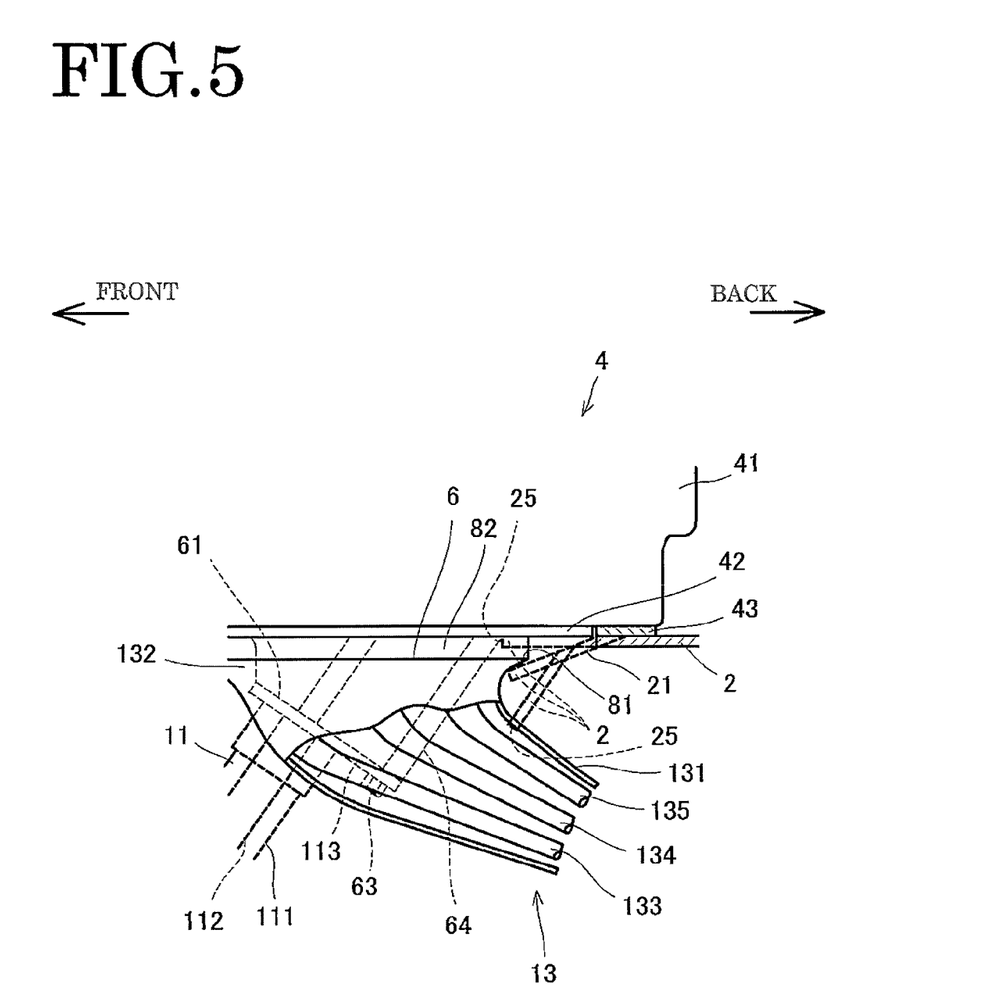
[FIG. 5] is a partial side view of the electric vehicle according to the present embodiment, showing the state of the vehicle in the rear collision.

FIG. 4 and FIG. 5 are schematic views showing that the vehicle has been struck from behind.

In the present embodiment, as shown in FIG. 4, when the vehicle is struck from behind, the floor panel 2 on the back side of the vehicle relative to the inverter 4 is moved toward the front of the vehicle. Even when the floor panel 2 is moved forward at this time, the end 25 (opening edge) of the floor panel 2 constituting the opening 21 contacts the inclined portion 64 located on the rear side of the first mounting portion 6. Thus, the end 25 of the floor panel 2 is guided by the inclined portion 64 inclined downwardly toward the front of the vehicle, and is moved downward. Consequently, the end 25 of the floor panel 2 can be inhibited from contacting the first high voltage harness 11, so that the electric power supply harness is minimally damaged. Even if, in this case, the end 25 of the floor panel 2 climbs over the inclined portion 64, it contacts the bolt 63 provided on the lower end side of the fixing portion 61, whereby the end 25 of the floor panel 2 is moved further downward. Hence, the contact of the end 25 of the floor panel 2 with the first high voltage harness 11 can be suppressed more reliably.

In regard to the three-phase wires as well, the end 25 of the floor panel 2 at the position opposed to the third high voltage harness 13 is moved toward the front as a result of rear collision, as shown in FIG. 5. In this case, even upon movement of the end 25 of the floor panel 2, the end 25 of the floor panel 2 contacts the rear end part of the mounting pedestal portion 82 projecting downward relative to the floor panel 2. Thus, direct contact of the end 25 of the floor panel 2 with the third high voltage harness 13 can be suppressed. Even if the end 25 of the floor panel 2 advances relative to the rear end part of the mounting pedestal portion 82, moreover, the end 25 of the floor panel 2 moves toward the lower part of the vehicle in accordance with the inclined portion 64, because the inclined portions 64 of the first and second mounting portions 6, 7 are located posteriorly to the W wire 135 disposed nearest the rear end of the vehicle among the U wire 133, V wire 134 and W wire 135 enveloped in the three-phase wire harness. Hence, the contact of the end of the floor panel 2 with the third high voltage harness 13 can be suppressed. Consequently, damage to the third high voltage harness 13 can be suppressed.

Should the end 25 of the floor panel 2 contact the third high voltage harness 13, in this case, only the W wire 135 disposed nearest the back of the vehicle contacts the end of the floor panel 2, because the U wire 133, V wire 134 and W wire 135 enveloped in the third high voltage harness 13 are arranged in a row in the longitudinal direction of the vehicle. If two of the three-phase wires break, a short circuit occurs. Even in the event of wire breakage upon contact of only the W wire 135 with the end 25 of the floor panel 2, on the other hand, no short circuit occurs. Thus, no sparks are generated, and safety can be improved. That is, arrangement of the three-phase wires in a row in the longitudinal direction of the vehicle, as in the present embodiment, is very effective in a rear collision of the vehicle.

In the present embodiment, as described above, the battery 3 and the motor 5 can be installed outside the vehicle compartment, while the inverter 4 can be installed within the vehicle compartment. Thus, a waterproof structure for the inverter 4 is unnecessary, and the routing of the high voltage harness outside the vehicle compartment ensures high safety. The routing of the high voltage harness outside the vehicle compartment may pose a problem about safety when the vehicle is struck from behind. In the present embodiment, however, the first mounting portion 6, the second mounting portion 7, and the third mounting portion 8 can protect the respective high voltage harnesses, thus securing high safety.

The present embodiment has described the mounting structure for the high voltage harnesses in the inverter 4 in dealing with the rear collision of the vehicle. However, the rear collision of the vehicle is not limitative. Front collision of the vehicle and lateral collision of the vehicle can also be accommodated. For example, the arrangement of the inverter 4 or the like can be changed, and the direction of inclination of the inclined portion 64 of the first mounting portion 6 can be rendered a rightward (or leftward) and downward direction, in preparation for the lateral collision of the vehicle.

In the present embodiment, moreover, the battery 3, the inverter 4 and the motor 5 are arranged in the longitudinal direction of the vehicle, but this arrangement is not limitative. Their positions may be changed using the layout of the vehicle.

In the present embodiment, the inclined portion 64 comprising the inclined surface is illustrated as the guide portion, but this is not limitative. Any other shape may be adopted, as long as it functions as a guide portion for guiding the first high voltage harness.

In the present embodiment, the electric car is presented as an example of the electric vehicle, but this is not limitative. The electric vehicle may be a so-called hybrid vehicle.

In the present embodiment, the inverter has been presented as an example of the electrical component unit, but this is not limitative. Any other electrical component unit needed in a circuit connecting the battery and the motor may be available.

EXPLANATIONS OF LETTERS OR NUMERALS

1 Electric car
2 Floor panel
3 Battery
4 Inverter
5 Motor
6 First mounting portion
7 Second mounting portion
8 Third mounting portion
11 First high voltage harness
12 Second high voltage harness
13 Third high voltage harness
21 Opening
25 End
41 Casing
42 Mounting surface
43 Sealing portion
61 Fixing portion
62 Opening
63 Bolt 64 Inclined portion
81 Third opening
82 Mounting pedestal portion
111 Sheathing portion
112 Plus wire
113 Flange portion
114 Flange portion bolt hole
131 Sheathing portion
132 Mounting portion
133 U wire
134 V wire
135 W wire

The invention claimed is:

1. An electric vehicle, comprising:
   a battery disposed on a lower part of a floor panel of the vehicle;
   an electrical component unit, disposed on an upper part of the floor panel, for converting electric power supplied from the battery to output the converted electric power to a motor;
   an electric power supply harness for connecting the electrical component unit and the battery; and
   a mounting portion for passing the electric power supply harness through an opening provided in the floor panel, and mounting the electric power supply harness to the electrical component unit,
   wherein the mounting portion opposes an opening edge of the opening, and has a guide portion for guiding the electric power supply harness in an obliquely downward direction of the opening, and
   wherein the guide portion guides the opening edge of the opening in the obliquely downward direction when the opening edge makes contact with the guide portion upon a collision of the vehicle.

2. The electric vehicle according to claim 1, wherein a fixing portion for fixing the electric power supply harness to the mounting portion is fastened to a lower end of the guide portion with a bolt.

3. The electric vehicle according to claim 2, further comprising:
   a three-phase wire harness for connecting the electrical component unit and the motor provided on the lower part of the floor panel,
   wherein the electrical component unit has a mounting pedestal portion, arranged side by side with the mounting portion, for fixing the three-phase wire harness,
   the mounting pedestal portion faces the opening of the floor panel and projects downwardly relative to the floor panel, and
   among three-phase electric wires of the three-phase wire harness, an electric wire provided nearest a rear end of the vehicle is disposed forwardly of the mounting portion.

4. The electric vehicle according to claim 3, wherein the guide portion opposes the opening edge, located on a rear side of the vehicle, of the opening, and guides the electric power supply harness forwardly and in the obliquely downward direction of the opening.

5. The electric vehicle according to claim 4, further comprising:
   electric wires including three-phase wires enveloped in a three-phase wire harness,
   wherein the three-phase wires are arranged in a row in a longitudinal direction of the vehicle.

6. The electric vehicle according to claim 2, wherein the guide portion opposes the opening edge, located on a rear side of the vehicle, of the opening, and guides the electric power supply harness forwardly and in the obliquely downward direction of the opening.

7. The electric vehicle according to claim 6, further comprising:
   electric wires including three-phase wires enveloped in a three-phase wire harness,
   wherein the three-phase wires are arranged in a row in a longitudinal direction of the vehicle.

8. The electric vehicle according to claim 1, further comprising:
   a three-phase wire harness for connecting the electrical component unit and the motor provided on the lower part of the floor panel,
   wherein the electrical component unit has a mounting pedestal portion, arranged side by side with the mounting portion, for fixing the three-phase wire harness,
   the mounting pedestal portion faces the opening of the floor panel and projects downwardly relative to the floor panel, and
   among three-phase electric wires of the three-phase wire harness, an electric wire provided nearest a rear end of the vehicle is disposed forwardly of the mounting portion.

9. The electric vehicle according to claim 8, wherein the guide portion opposes the opening edge, located on a rear side of the vehicle, of the opening, and guides the electric power supply harness forwardly and in the obliquely downward direction of the opening.

10. The electric vehicle according to claim 9, further comprising:
    electric wires including three-phase wires enveloped in a three-phase wire harness,
    wherein the three-phase wires are arranged in a row in a longitudinal direction of the vehicle.

11. The electric vehicle according to claim 1, wherein the guide portion opposes the opening edge, located on a rear side of the vehicle, of the opening, and guides the electric power supply harness forwardly and in the obliquely downward direction of the opening.

12. The electric vehicle according to claim 11, further comprising:
    electric wires including three-phase wires enveloped in a three-phase wire harness,
    wherein the three-phase wires are arranged in a row in a longitudinal direction of the vehicle.

* * * * *